(12) United States Patent
Chen et al.

(10) Patent No.: US 8,525,975 B2
(45) Date of Patent: Sep. 3, 2013

(54) DETECTOR DEVICE AND MOBILE ROBOT HAVING THE SAME

(75) Inventors: Tien-Chen Chen, Taipei County (TW); Dah-Prong Lai, Taipei County (TW)

(73) Assignee: Agait Technology Corporation, Taipei County (TW)

( * ) Notice: Subject to any disclaimer, the term of this patent is extended or adjusted under 35 U.S.C. 154(b) by 402 days.

(21) Appl. No.: 12/956,002

(22) Filed: Nov. 30, 2010

(65) Prior Publication Data

US 2012/0026481 A1 Feb. 2, 2012

(30) Foreign Application Priority Data

Jul. 29, 2010 (TW) ................................ 99214494 U (51) Int. Cl.
*G01C 3/08* (2006.01)

(52) U.S. Cl.
USPC ........................................................ 356/4.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 4,611,911 A * | 9/1986 | Kadomatsu | 356/4.01 |
| 4,687,914 A * | 8/1987 | Tsunekawa et al. | 250/201.4 |
| 4,843,415 A * | 6/1989 | Matsui et al. | 396/80 |
| 5,715,043 A * | 2/1998 | Hasegawa et al. | 356/3.14 |
| 5,781,281 A * | 7/1998 | Miyano | 356/4.01 |
| 5,812,893 A * | 9/1998 | Hikita et al. | 396/106 |
| 6,163,371 A * | 12/2000 | Kato et al. | 356/4.03 |
| 6,308,015 B1 * | 10/2001 | Matsumoto | 396/106 |
| 6,583,433 B2 * | 6/2003 | Sugiyama et al. | 250/559.38 |
| 6,642,998 B2 * | 11/2003 | Nakagawa | 356/3.14 |
| 2004/0004723 A1 * | 1/2004 | Seko et al. | 356/498 |
| 2005/0185196 A1 * | 8/2005 | Kitamura et al. | 356/614 |
| 2005/0206873 A1 * | 9/2005 | Tanaka et al. | 356/4.03 |
| 2005/0274890 A1 * | 12/2005 | Anderton et al. | 250/334 |
| 2007/0247611 A1 * | 10/2007 | Tamaki et al. | 356/3.11 |
| 2010/0191418 A1 * | 7/2010 | Mimeault et al. | 701/36 |
| 2011/0170086 A1 * | 7/2011 | Oouchida | 356/4.01 |

\* cited by examiner

*Primary Examiner* — Luke Ratcliffe
(74) *Attorney, Agent, or Firm* — Muncy, Geissler, Olds & Lowe, PLLC (57) ABSTRACT

A detector device includes a detector module and a lens module. The detector module includes an optical emitter and a photon detector spaced apart from the optical emitter. The lens body includes a first light-transmissive surface, a second light-transmissive surface, and a third light-transmissive surface. The optical emitter is operable to emit a light beam passing through the first light-transmissive surface and the second light-transmissive surface toward a surface so as to define a field of emission on the surface. The photon detector is aligned with the first and third light-transmissive surfaces so as to define a field of view on the surface. An extent of overlap between the field of view and the field of emission varies in accordance with a distance between the optical emitter and the surface.

10 Claims, 7 Drawing Sheets

DETECTOR DEVICE AND MOBILE ROBOT HAVING THE SAME

CROSS-REFERENCE TO RELATED APPLICATION

This application claims priority of Taiwanese Application No. 099214494, filed on Jul. 29, 2010.

BACKGROUND OF THE INVENTION

1. Field of the Invention

The present invention relates to a detector device and a mobile robot having the same, more particular to a detector device and a mobile robot having the same that can detect obstacles.

2. Description of the Related Art

In U.S. Pat. No. 7,155,308, there is disclosed a robot obstacle detection system including an optical emitter which emits a directed beam having a defined field of emission and a photon detector having a defined field of view which intersects the field of emission of the optical emitter at a region. When a surface is present in the region, the robot keeps moving on the surface. When an obstacle is present in the region, the robot is redirected or turned away to avoid the obstacle.

The optical emitter and the photon detector of the conventional obstacle detection system are angled with respect to each other so that the field of view of the photon detector intersects the field of emission of the optical emitter at a finite region for detecting and avoiding obstacles.

SUMMARY OF THE INVENTION

An object of the present invention is to provide a detector device in which a photon detector is able to received reflected light beam via a lens module so that the detector device may detect obstacles more precisely.

Another object of the present invention is to provide a mobile robot with the detector device.

According to one aspect of the present invention, a detector device is adapted to be disposed in a mobile robot for detecting a distance between the mobile robot and a surface. The detector device includes a detector module and a lens module.

The detector module includes an optical emitter and a photon detector spaced apart from the optical emitter. The lens module includes a lens body disposed adjacent to the detector module. The lens body includes a first light-transmissive surface, a second light-transmissive surface, and a third light-transmissive surface. The first light-transmissive surface is disposed adjacent to the detector module, and has a first end and a second end opposite to the first end. The second light-transmissive surface extends inclinedly from the first end of the first light-transmissive surface toward the second end of the first light-transmissive surface and away from the detector module. The third light-transmissive surface extends inclinedly from the second end of the first light-transmissive surface toward the first end of the first light-transmissive surface and away from the detector module. The optical emitter is operable to emit a light beam passing through the first light-transmissive surface and the second light-transmissive surface toward the surface so as to define a field of emission on the surface. The photon detector is aligned with the first and third light-transmissive surfaces so as to define a field of view on the surface. An extent of overlap between the field of view and the field of emission varies in accordance with a distance between the optical emitter and the surface.

Preferably, each of the second and third light-transmissive surfaces is an inclined planar surface and has a tip end opposite to the first light-transmissive surface and connected to the tip end of the other of the second and third light-transmissive surfaces. Alternatively, each of the second and third light-transmissive surfaces is a curved surface and has a tip end opposite to the first light-transmissive surface and connected to the tip end of the other of the second and third light-transmissive surfaces. In yet another alternative, one of the second and third light-transmissive surfaces is a curved surface and the other one of the second and third light-transmissive surfaces is an inclined planar surface. Each of the second and third light-transmissive surfaces has a tip end opposite to the first light-transmissive surface and connected to the tip end of the other of the second and third light-transmissive surfaces.

Preferably, the detector module further includes a detector housing for receiving the optical emitter and the photon detector. The lens module further includes a pair of side arms respectively connected to the first and second ends of the first light-transmissive surface. The detector housing has a pair of first sides opposite to each other, and the side arms respectively abut against the first sides of the detector housing. One of the side arms is formed with an engaging component for engaging one side of the detector housing opposite to the second and third light-transmissive surfaces of the lens module.

Preferably, the detector housing further has a pair of second sides between the first sides thereof, and the second sides are indented to form a pair of grooves. The lens module further includes a pair of protrusions that extend from the first light-transmissive surface and that are spaced apart from each other, and the protrusions of the lens module engage the grooves of the detector housing.

According to another aspect of the present invention, a mobile robot includes a robot casing, a circuit board, and a detector device. The robot casing has an opening. The circuit board is disposed in the robot casing. The detector device is disposed in the robot casing and is aligned with the opening. The detector device includes a detector module and a lens module. The detector module includes an optical emitter and a photon detector spaced apart from the optical emitter. Each of the optical emitter and the photon detector is electrically coupled to the circuit board. The lens module includes a lens body disposed adjacent to the detector module. The lens body includes a first light-transmissive surface, a second light-transmissive surface, and a third light-transmissive surface.

The first light-transmissive surface is disposed adjacent to the detector module, and has a first end and a second end opposite to the first end. The second light-transmissive surface extends inclinedly from the first end of the first light-transmissive surface toward the second end of the first light-transmissive surface and away from the detector module. The third light-transmissive surface extends inclinedly from the second end of the first light-transmissive surface toward the first end of the first light-transmissive surface and away from the detector module. The optical emitter is operable to emit a light beam passing through the first light-transmissive surface and the second light-transmissive surface toward a surface so as to define a field of emission on the surface. The photon detector is aligned with the first and third light-transmissive surfaces so as to define a field of view on the surface. An extent of overlap between the field of view and the field of emission varies in accordance with a distance between the optical emitter and the surface.

BRIEF DESCRIPTION OF THE DRAWINGS

Other features and advantages of the present invention will become apparent in the following detailed description of the four preferred embodiments with reference to the accompanying drawings, of which.

DETAILED DESCRIPTION OF THE PREFERRED EMBODIMENTS

Before the present invention is described in greater detail with reference to the preferred embodiments, it should be noted that the same reference numerals are used to denote the same elements throughout the following description.

Figure 1:
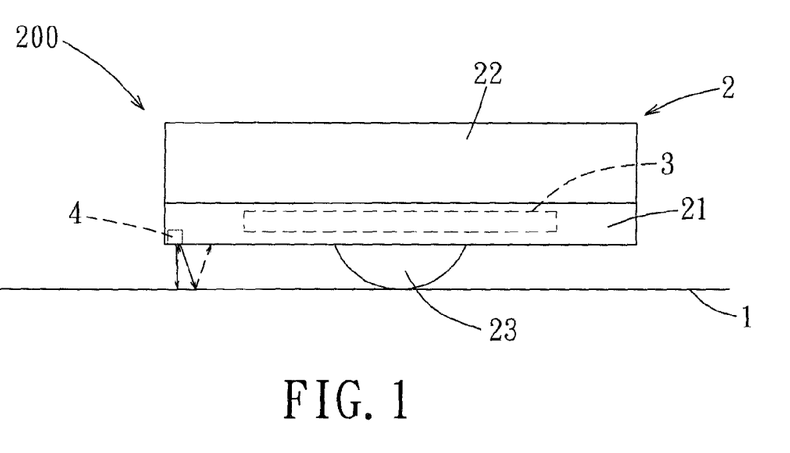
FIG. 1 is a side elevation view of a first preferred embodiment of a mobile robot of the present invention disposed on a surface.
Figure 2:
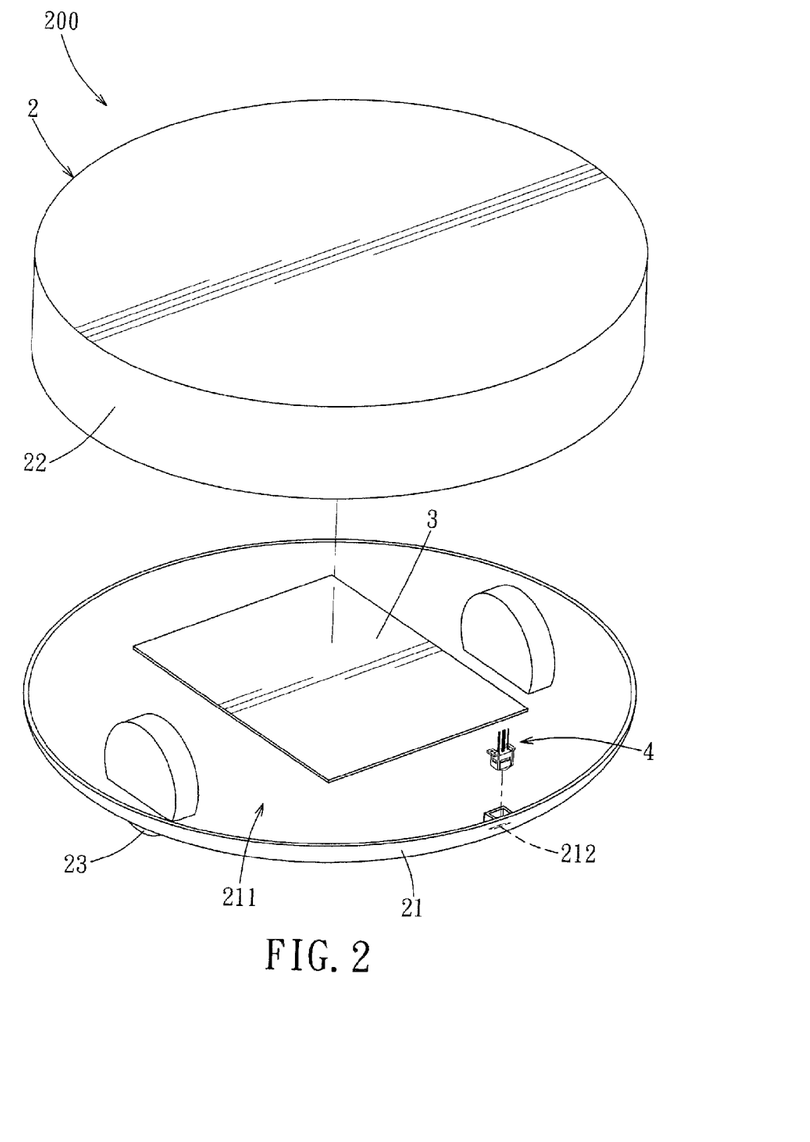
FIG. 2 is a partly exploded respective view of the first preferred embodiment of the mobile robot of the present invention.

Referring to FIG. 1 and FIG. 2, a first preferred embodiment of a mobile robot 200 with a detector device of the present invention is illustrated using a cleaning robot as an example. The mobile robot 200 includes a robot casing 2, a circuit board 3, and a detector device 4. The mobile robot 200 is able to move on a surface 1, wherein the surface 1 is a floor in the example.

The robot casing 2 includes a bottom casing 21 and a removable top cover 22 covering the bottom casing 21. The bottom casing 21 is formed with a receiving space 211 for receiving the circuit board 3. The bottom casing 21 is further formed with an opening 212 for communicating the receiving space 211 with an exterior of the robot casing 2. The bottom casing 21 is provided with a set of wheels 23. The circuit board 3 controls rotation of the wheels 23 to thereby control movement and direction of the robot casing 2 in a known manner. Moreover, the detector device 4 is received in the receiving space 211 and is aligned with the opening 212. The detector device 4 detects a distance between the mobile robot 200 and the surface 1 so that the mobile robot 200 will may be prevented from falling.

Figure 3:
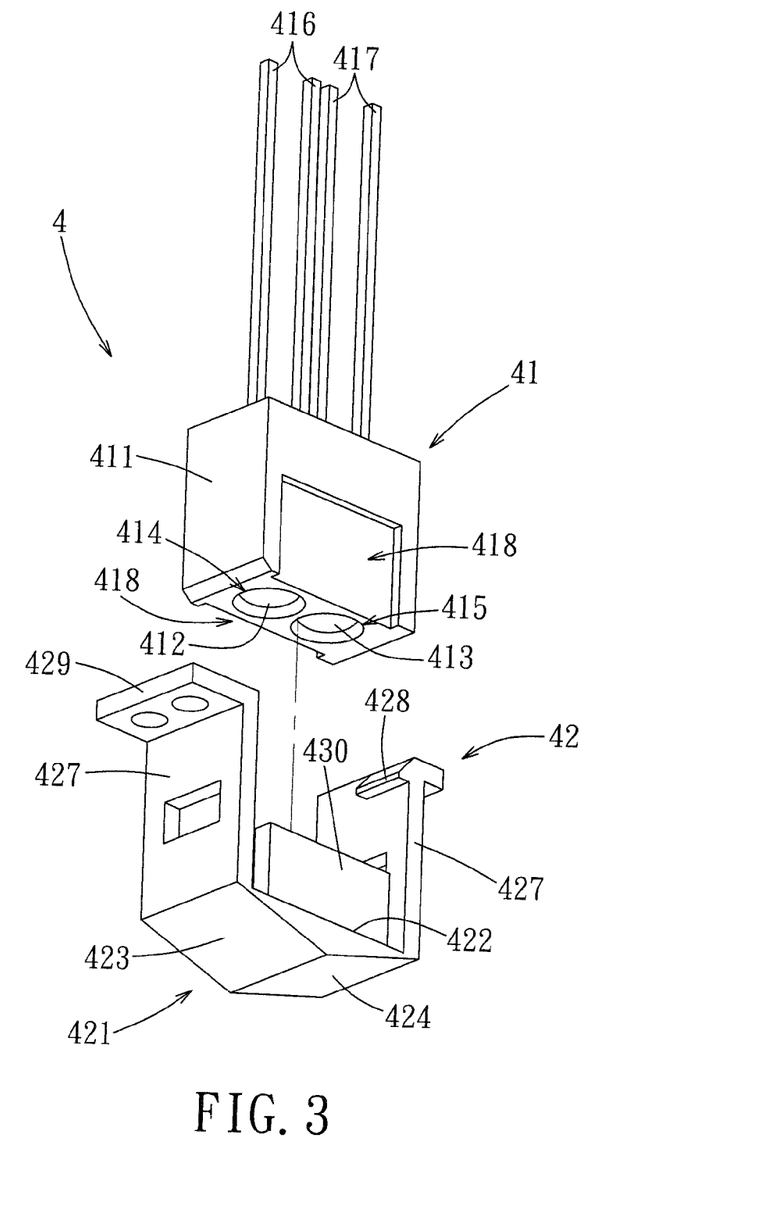
FIG. 3 is an exploded perspective view of a detector device of the first preferred embodiment of the mobile robot of the present invention.
Figure 4:
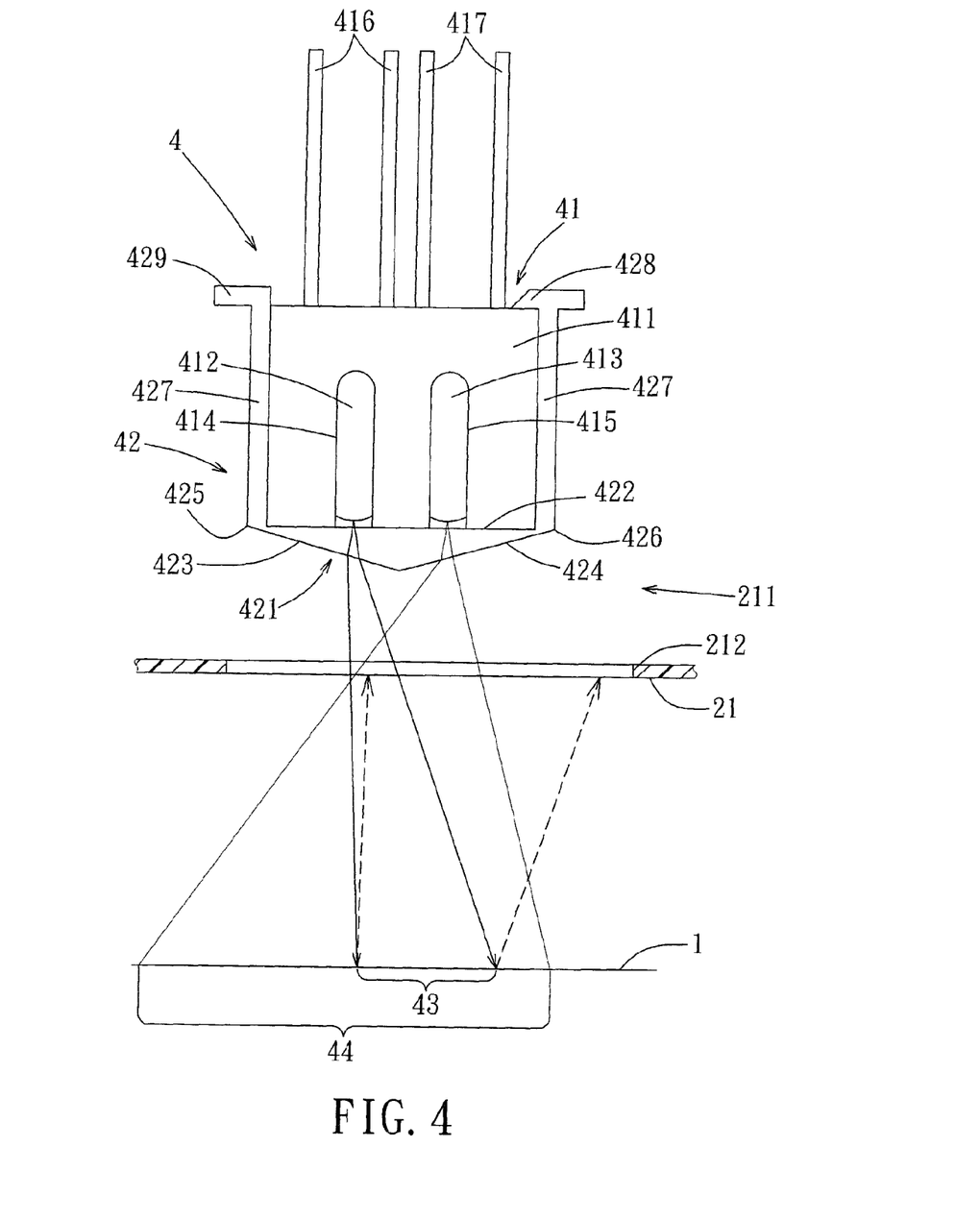
FIG. 4 is a fragmentary schematic partly cross-sectional view of the first preferred embodiment of the mobile robot of the present invention, illustrating an extent of overlap between a field of view and a field of emission.

Referring FIG. 2 to FIG. 4, the detector device 4 includes a detector module 41 which includes a detector housing 411, an optical emitter 412, and a photon detector 413. The detector housing 411 has a first installation channel 414 opening toward the surface 1 and substantially perpendicular to the horizontal plane, and a second installation channel 415, which opens toward the surface 1, and is substantially perpendicular to the surface 1, and is spaced apart from the first installation channel 414. The optical emitter 412 is installed and received in the first installation channel 414, and the photon detector 413 is installed and received in the second installation channel 415. The optical emitter 412 is connected electrically to the circuit board 3 through a plurality of wires 416, and the circuit board 3 may provide power to the optical emitter 412 so that the optical emitter 412 is able to emit a light beam toward the surface 1 along the first installation channel 414. Furthermore, the photon detector 413 is connected electrically to the circuit board 3 through a plurality of wires 417, and the photon detector 413 detects the light beam that is emitted from the optical emitter 412 and reflected by the surface 1. In this embodiment, the optical emitter 412 is an infrared ray emitter, and the photon detector 413 is an infrared ray receiver.

The detector device 4 further includes a lens module 42 which includes a lens body 421 disposed adjacent to the detector housing 411 of the detector module 41. The lens body 421 is a prism which includes a first light-transmissive surface 422, a second light-transmissive surface 423, and a third light-transmissive surface 424. The first light-transmissive surface 422 is substantially parallel to the horizontal plane, and has a first end 425 and a second end 426 opposite to the first end 425. The second light-transmissive surface 423 extends inclinedly from the first end 425 of the first light-transmissive surface 422 toward the second end 426 of the first light-transmissive surface 422 and away from the detector module 41. The third light-transmissive surface 424 extends inclinedly from the second end 426 of the first light-transmissive surface 422 toward the first end 425 of the first light-transmissive surface 422 and away from the detector module 41. In this embodiment, each of the second and third light-transmissive surfaces 423, 424 is an inclined planar surface and has a tip end opposite to the first light-transmissive surface 422. The tip ends of the second and third light-transmissive surfaces 423, 424 are connected to each other so that the lens body 421 assumes a prism structure.

Preferably, in order to fasten the lens body 421 on to the detector module 41, the lens module 42 further includes a pair of side arms 427 respectively connected to the first and second ends 425, 426 of the first light-transmissive surface 422. The detector housing 411 has a pair of first sides opposite to each other, and the side arms 427 respectively abut against the first sides of the detector housing 411. One of the side arms 427 is formed with an engaging component 428, such as a stop, for engaging one side of the detector housing 411 opposite to the second and third light-transmissive surfaces 423, 424 of the lens module 42 so that the detector housing 411 will not separate from the side arms 427 easily. The other one of the side arms 427 has an end, which is opposite to the first light-transmissive surface 422, formed with a mounting tab 429 for fastening onto the bottom casing 21 with the use of screws of the like so that the detector module 41 and the lens module 42 are fixed to the bottom casing 21. Moreover, the detector housing 411 further has a pair of second sides between the first sides thereof, and the second sides are indented to form a pair of grooves 418. The lens module 42 further includes a pair of protrusions 430 that extend from the first light-transmissive surface 422 and that are spaced apart from each other. The protrusions 430 of the lens module 42 engage the grooves 418 of the detector housing 411. In this way, the detector housing 411 may be restricted from wobbling between the protrusions 430 so as to result a more stable connection between the lens module 42 and the detector module 41.

The first light-transmissive surface 422 of the lens body 421 is fixed in position and is aligned with openings of the first and second installation channels 414, 415. Thus, the light beam emitted from the optical emitter 412 is incident upon the first light-transmissive surface 422, enters the lens body 421, and is refracted and emitted from the second light-transmissive surface 423 so that the light beam is redirected inclinedly in a direction toward the photon detector 413 as it exits the opening 212 of the robot casing 2. The optical emitter 412 defines a field of emission 43 on the surface 1. The photon detector 413 is aligned with the first and third light-transmissive surfaces 422, 424 so as to define a field of view 44 on the surface 1. Moreover, an extent of overlap between the field of view 44 and the field of emission 43 varies in accordance with a distance between the optical emitter 412 and the surface 1.

Referring to FIG. 1 and FIG. 4, the optical emitter 412 and the surface 1 are spaced at a predetermined distance (e.g., 3 cm) when the mobile robot 200 moves on the surface 1. The field of view 44 intersects and overlaps the field of emission 43 so that the photon detector 413 receives the light beam, which is emitted from the optical emitter 412 and reflected by the surface 1. Meanwhile, the photon detector 413 will transmit a control signal to the circuit board 3 so that the circuit board 3 is able to judge that the surface 1 is flat, and is able to control the mobile robot 200 to continue moving on and cleaning the surface 1.

Figure 5:
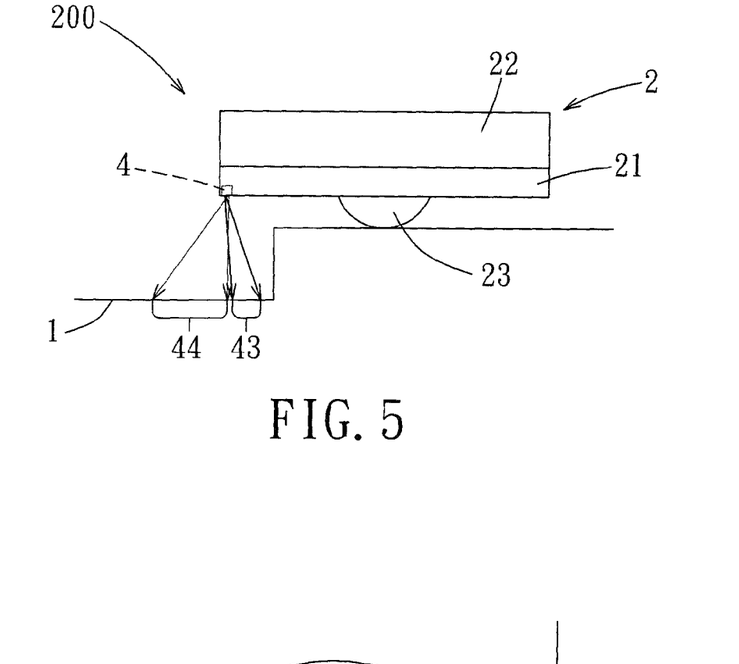
FIG. 5 is a side elevation view of the first preferred embodiment of the mobile robot of the present invention, illustrating that the field of view and the field of emission will not overlap with each other under a condition that the mobile robot is approaching a downward stair.

Referring to FIG. 5, the optical emitter 412 and the surface 1 are spaced at a farther distance when the surface 1 approached by the mobile robot 200 is a downward stair. The field of view 44 does not intersect and overlap the field of emission 43 so that the photon detector 413 is not able to receive the light beam, which is emitted from the optical emitter 412, and reflected by the surface 1, at this time. Therefore, the photon detector 413 will transmit another control signal to the circuit board 3 so that the circuit board 3 is able to judge that the surface 1 being approached is a downward stair, and is able to control the mobile robot 200 to stop moving or to turn away or be redirected. In this way, the mobile robot 200 may be prevented from falling.

Referring again to FIG. 4, the light beam is refracted and emitted from the second light-transmissive surface 423 so that the light beam is redirected inclinedly in the direction toward the photon detector 413 as it exits the opening 212. Then, the light beam is reflected by the surface 1, and is redirected toward the photon detector 413. Thus, the energy of the reflected light beam received by the photon detector 413 is relatively strong so that the detector device 4 is still able to function normally on a darker color surface which absorbs more energy from incident light. Moreover, strands of a carpet (not shown) are very close to the bottom casing 21 especially when the surface 1 is the carpet with long strands. Because the photon detector 413 has a field of view that intersects a path of the light beam from the optical emitter 412 according to this embodiment, the photon detector 413 is able to receive a reflected light beam from the strands of the carpet effectively. In this way, the mobile robot 200 is capable of moving on and cleaning carpets with long strands.

Figure 6:
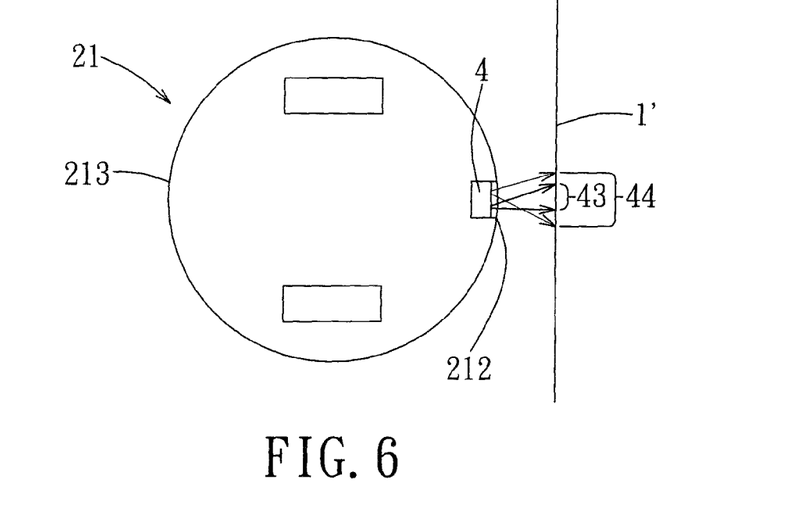
FIG. 6 is a top view of a second preferred embodiment of the mobile robot of the present invention, illustrating that the detector device is configured to detect a wall as a surface, with a top cover omitted for the sake of clarity.

Referring to FIG. 6, a second preferred embodiment of the mobile robot with the detector device of the present invention is shown. The structure and operation of the second preferred embodiment are substantially the same as those of the first preferred embodiment. However, in this embodiment, a surrounding wall 213 of the bottom casing 21 is formed with an opening 212 so that the detector device 4 is able to detect a surface 1' such as a wall. The detector device 4 judges that the mobile robot 200 is approaching the surface 1' when the field of view 44 intersects and overlaps the field of emission 43. On the other hand, the detector device 4 judges that the mobile robot 200 is far from the surface 1', and the circuit board 3 controls the movement of the mobile robot 200 toward the surface 1' so that the mobile robot 200 is able to keep an appropriate distance from the surface 1' when the field of view 44 does not intersect and overlap the field of emission 43. In this way, the mobile robot 200 is able to move and clean along a surface 1' and will not hit the surface 1'.

Figure 7:
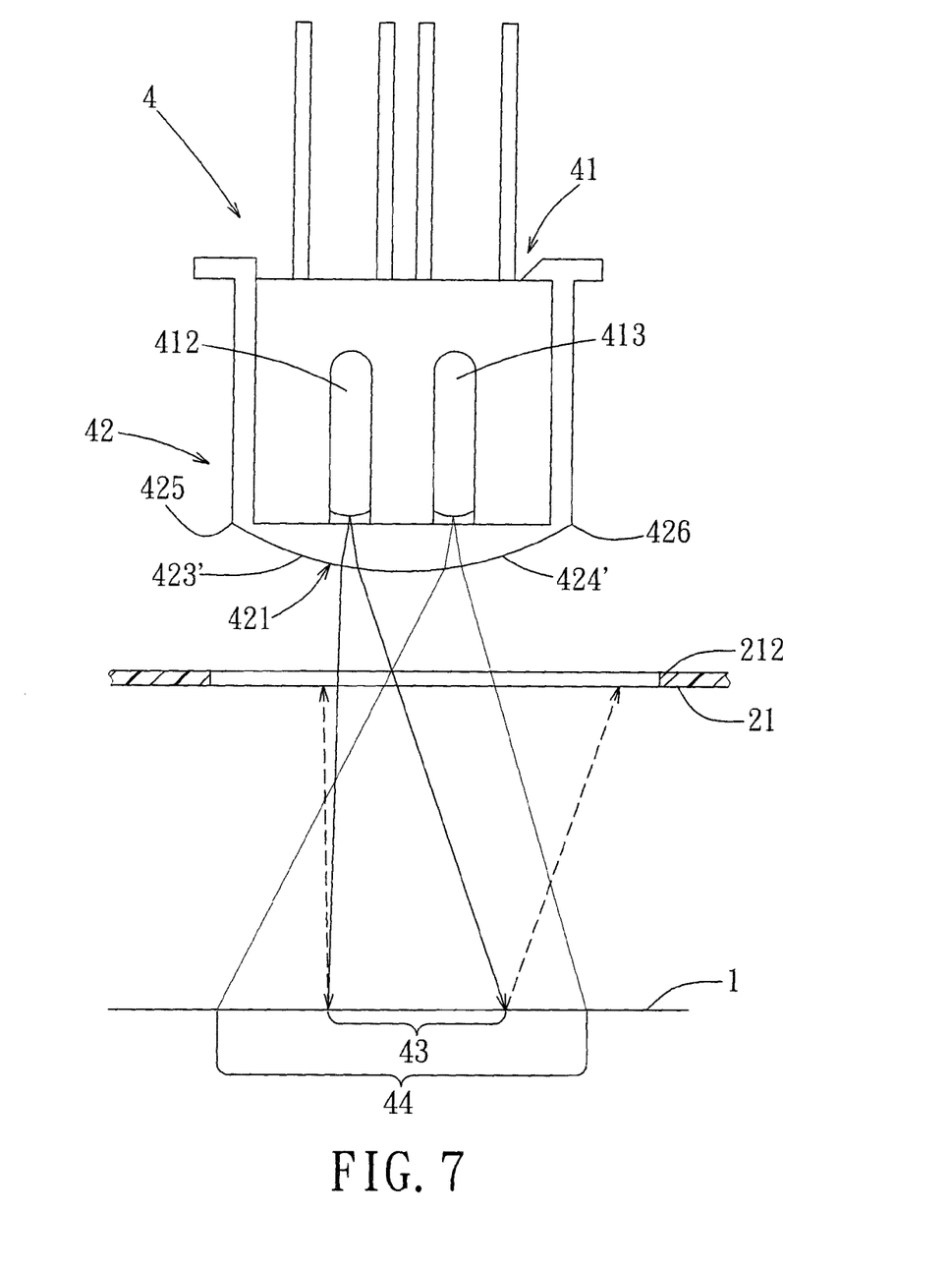
FIG. 7 is a fragmentary schematic partly cross-sectional view of a third preferred embodiment of the mobile robot of the present invention, illustrating that each of second and third light-transmission surfaces of a lens body is a curved surface.
Figure 8:
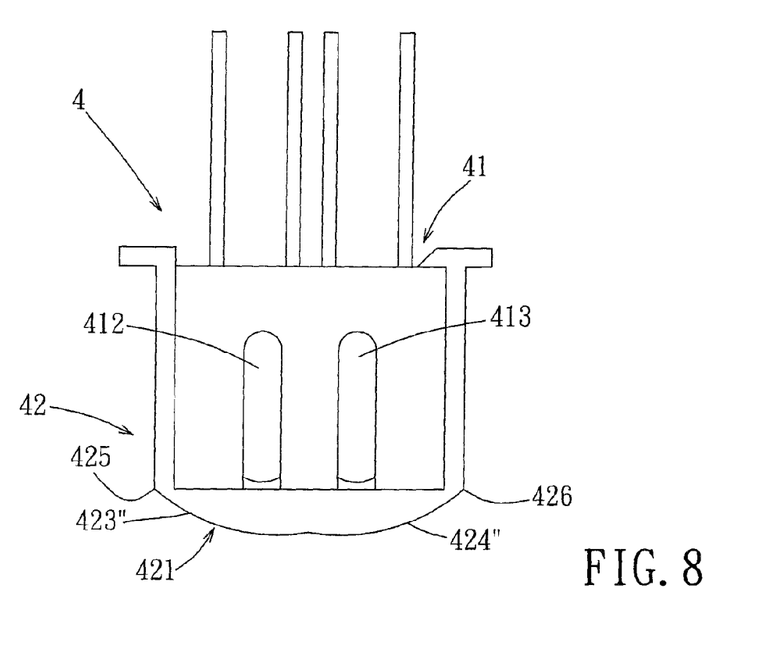
FIG. 8 is a schematic view of a modified detector device of the third preferred embodiment of the mobile robot of the present invention.

Referring to FIG. 7, a third preferred embodiment of the mobile robot with the detector device of the present invention is shown. The structure and operation of the third preferred embodiment are substantially the same as those of the first preferred embodiment. However, in this embodiment, each of the second and third light-transmissive surfaces 423', 424' is a curved surface so that a section of the lens body 421 assumes a curve. The light beam is focused so that the detector device is able to function on a non-highly-reflective surface (e.g., relatively rough surfaces). Referring to FIG. 8, modified second and third light-transmissive surfaces 423", 424" of the third embodiment are illustrated. The curvatures of the second and third light-transmissive surfaces 423', 424' are different from the second and third light-transmissive surfaces 423', 424' shown in FIG. 7. Therefore, the designs of the surfaces of the lens body 421 may be modified according to practical requirements.

Figure 9:
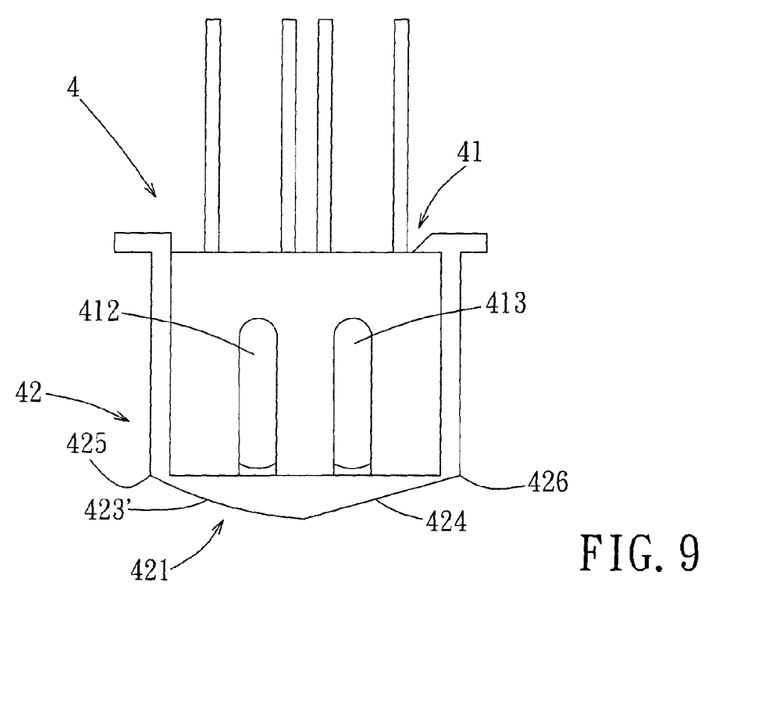
FIG. 9 is a schematic view of a detector device of a fourth preferred embodiment of the mobile robot of the present invention, illustrating that one of the second and third light-transmission surfaces of the lens body is a curved surface and the other one of the second and third light-transmission surfaces of the lens body is an inclined planar surface.

Referring to FIG. 9, a fourth preferred embodiment of the mobile robot with the detector device of the present invention is shown. The structure and operation of the fourth preferred embodiment are substantially the same as those of the first preferred embodiment. However, in this embodiment, one of the second and third light-transmissive surfaces 423', 424 is an inclined planar surface and the other one of the second and third light-transmissive surfaces 423', 424 is a curved surface. In this embodiment, the second light-transmissive surface 423' is a curved surface and the third light-transmissive surface 424 is an inclined planar surface.

In summary, the field of view 44 intersects and overlaps the field of emission 43 because of the design of the lens body 421 of the lens module 42, in which the light beam emitted from the optical emitter 412 is refracted by the lens body 421 and the incident angle of the refracted light beam is redirected. Thus, the photon detector 413 is able to receive the reflected light beam effectively with relatively strong strength. In this way, the detector device is able to detect obstacles more precisely.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A detector device adapted to be disposed on a mobile robot for detecting a distance between the mobile robot and a surface, said detector device comprising:

a detector module including an optical emitter and a photon detector spaced apart from said optical emitter; and
a lens module including a lens body disposed adjacent to said detector module, said lens body including:
   a first light-transmissive surface disposed adjacent to said detector module, said first light-transmissive surface having a first end and a second end opposite to said first end;
   a second light-transmissive surface extending inclinedly from said first end of said first light-transmissive surface toward said second end of said first light-transmissive surface and away from said detector module; and
   a third light-transmissive surface extending inclinedly from said second end of said first light-transmissive surface toward said first end of said first light-transmissive surface and away from said detector module;
wherein, said optical emitter is operable to emit a light beam passing through said first light-transmissive surface and said second light-transmissive surface toward the surface so as to define a field of emission on the surface, said photon detector being aligned with said first and third light-transmissive surfaces so as to define a field of view on the surface, an extent of overlap between the field of view and the field of emission varying in accordance with a distance between said optical emitter and the surface; and
wherein said detector module further includes a detector housing for receiving said optical emitter and said photon detector, said lens module further including a pair of side arms respectively connected to said first and second ends of said first light-transmissive surface, said detector housing having pair of first sides opposite to each other, said side arms respectively abutting against said first sides of said detector housing, one of said side arms being formed with an engaging component for engaging one side of said detector housing opposite to said second and third light-transmissive surfaces of said lens module.

2. The detector device as claimed in claim 1, wherein each of said second and third light-transmissive surfaces is an inclined planar surface and has a tip end opposite to said first light-transmissive surface, said tip ends of said second and third light-transmissive surfaces being connected to each other.

3. The detector device as claimed in claim 1, Wherein each of said second and third light-transmissive surfaces is a curved surface and has a tip end opposite to said first light-transmissive surface, said tip ends of said second and third light-transmissive surfaces being connected to each other.

4. The detector device as claimed in claim 1, wherein one of said second and third light-transmissive surfaces is a curved surface and the other one of said second and third light-transmissive surfaces is an inclined planar surface, each of said second and third light-transmissive surfaces having a tip end opposite to said first light-transmissive surface, said tip ends of said second and third light-transmissive surfaces being connected to each other.

5. The detector device as claimed in claim 1, wherein said detector housing further has a pair of second sides between said first sides thereof, said second sides being indented to form a pair of grooves, said lens module further including a pair of protrusions that extend from said first light-transmissive surface and that are spaced apart from each other, said protrusions of said lens module engaging said grooves of said detector housing.

6. A mobile robot comprising:
a robot casing having an opening;
a circuit board disposed in said robot casing; and
a detector device disposed in said robot casing and aligned with said opening, said detector device including:
   a detector module including an optical emitter and a photon detector spaced apart from said optical emitter, said optical emitter and said photon detector being electrically coupled to said circuit board; and
   a lens module including a lens body disposed adjacent to said detector module, said lens body including:
      a first light-transmissive surface disposed adjacent to said detector module, said first light-transmissive surface having a first end and a second end opposite to said first end;
      a second light-transmissive surface extending inclinedly from said first end of said first light-transmissive surface toward said second end of said first light-transmissive surface and away from said detector module; and
      a third light-transmissive surface extending inclinedly from said second end of said first light-transmissive surface toward said first end of said first light-transmissive surface and away from said detector module;
   wherein, said optical emitter is operable to emit a light beam passing through said first light-transmissive surface and said second light-transmissive surface toward a surface so as to define a field of emission on the surface, said photon detector being aligned with said first and third light-transmissive surfaces so as to define a field of view on the surface, an extent of overlap between the field of view and the field of emission varying in accordance with a distance between said optical emitter and the surface; and
   wherein said detector module further includes a detector housing for receiving said optical emitter said photon detector said lens module further including a pair of side arms respectively connected to said first and second ends of said first light-transmissive surface, said detector housing having a pair of first sides opposite to each other, said side arms respectively abutting against said first sides of said detector housing one of said side arms being formed with an engaging component for engaging one side of said detector housing opposite to said second and third light-transmissive surfaces of said lens module.

7. The mobile robot as claimed in claim 6, wherein each of said second and third light-transmissive surfaces is an inclined planar surface and has a tip end opposite to said first light-transmissive surface, said tip ends of said second and third light-transmissive surfaces being connected to each other.

8. The mobile robot as claimed in claim 6, wherein each of said second and third light-transmissive surfaces is a curved surface and has a tip end opposite to said first light-transmissive surface, said tip ends of said second and third light-transmissive surfaces being connected to each other.

9. The mobile robot as claimed in claim 6, wherein one of said second and third light-transmissive surfaces is a curved surface and the other one of said second and third light-transmissive surfaces is an inclined planar surface, each of said second and third light-transmissive surfaces having a tip end opposite to said first light-transmissive surface, said tip ends of said second and third light-transmissive surfaces being connected to each other.

10. The mobile robot as claimed in claim 6, wherein said detector housing further has a pair of second sides between said first sides thereof, said second sides being indented to form a pair of grooves, said lens module further including a pair of protrusions that extend from said first light-transmissive surface and that are spaced apart from each other, said protrusions of said lens module engaging said grooves of said detector housing.

\* \* \* \* \*